(12) United States Patent
Johnson et al.

(10) Patent No.: US 6,346,585 B1
(45) Date of Patent: Feb. 12, 2002

(54) AMMONIUM HETEROPOLYACID CATALIZED POLYMERIZATION OF OLEFINS

(75) Inventors: John R. Johnson, Euclid; James D. Burrington, Mayfield Village, both of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/344,129

(22) Filed: Jun. 24, 1999

(51) Int. Cl.⁷ .............................. C08F 10/10; C08F 4/22
(52) U.S. Cl. .................. 526/130; 526/172; 526/233; 526/348.7; 502/210; 502/211
(58) Field of Search ................. 526/172, 233, 526/335, 348.7, 130

(56) References Cited

U.S. PATENT DOCUMENTS

| | | | |
|---|---|---|---|
| 2,237,460 A | 4/1941 | Thompson | 196/10 |
| 2,301,966 A | 11/1942 | Michel et al. | 260/683 |
| 2,798,890 A | 7/1957 | Waterman et al. | 260/673 |
| 2,825,704 A | 3/1958 | Arnold et al. | 260/2 |
| 2,982,799 A | 5/1961 | Klinkenberg | 260/683.15 |
| 3,374,285 A | 3/1968 | Henke et al. | 260/683.15 |
| 3,920,582 A | 11/1975 | Rona | 252/430 |
| 4,152,499 A | 5/1979 | Boerzel et al. | 526/52.4 |
| 4,605,808 A | 8/1986 | Samson | 585/525 |
| 5,191,044 A | * 3/1993 | Rath | 526/212 |
| 5,254,649 A | * 10/1993 | Miln et al. | 526/221 |
| 5,286,823 A | * 2/1994 | Rath | 526/237 |
| 5,710,225 A | * 1/1998 | Johnson et al. | 526/172 |

FOREIGN PATENT DOCUMENTS

| | | | |
|---|---|---|---|
| DE | 197 04 482 | 8/1998 | |
| DE | 19734176 A1 * | 2/1999 | |
| EP | 598 609 | 5/1994 | C08F/4/647 |
| GB | 847 784 | 9/1960 | |
| GB | 1 184 675 | 3/1970 | |
| GB | 1184685 | 3/1970 | B01J/11/32 |
| JP | 06/287213 | 10/1994 | C08F/4/648 |
| JP | 07/242573 | 9/1995 | C07C/15/12 |
| JP | 08/012601 | 1/1996 | C07C/15/50 |
| JP | 08/283326 | 10/1996 | C08F/4/642 |
| JP | 09/052908 | 2/1997 | C08F/4/14 |
| WO | WO 94/13714 | 6/1994 | C08F/210/00 |
| WO | WO 95/29940 | 11/1995 | |
| WO | WO 95/34619 | 12/1995 | C10M/163/00 |

* cited by examiner

*Primary Examiner*—David W. Wu
*Assistant Examiner*—R. Rabago
(74) *Attorney, Agent, or Firm*—David M. Shold; Michael F. Esposito

(57) ABSTRACT

Calcined ammonium salts of phosphotungstic acid salts are used to polymerize $C_2$–$C_{30}$ α-olefins and derivatives thereof to form highly reactive products having a high content of terminal vinylidene groups and β-isomers in resonance therewith.

31 Claims, No Drawings

AMMONIUM HETEROPOLYACID CATALYZED POLYMERIZATION OF OLEFINS

BACKGROUND OF THE INVENTION

The present invention provides a method for preparing high vinylidene polyisobutylene by polymerizing isobutylene with a solid catalyst of a calcined ammonium salt of a heteropolyacid.

It is well known to polymerize olefins using boron trifluoride ($BF_3$). The polymers so produced are highly reactive due to a large percentage of their terminal groups having vinylidene structure. The reactivity of polyolefins has been related to double bond content and the location thereof in the polymer.

U.S. Pat. No. 4,152,499, Boerzel et al., May 1, 1979, discloses the synthesis of polyisobutylene polymers having a degree of polymerization of 10 to 100 units and a high proportion of reactive double bonds. The isobutene is polymerized with boron trifluoride as the initiator at −50° C. to +30° C. The polymer contains a proportion of double bonds capable of reacting with maleic anhydride of 60 to 90% of theory. The adducts from the polyisobutylene/maleic anhydride are reacted with polyamines to form products useful as lubricating oil additives.

Polyolefins have also been prepared by polymerization catalyzed with heteropolyacids. U.S. Pat. No. 5,710,225, Johnson et al., Jan. 20, 1998, discloses a method for producing polymers by polymerization of olefins, by contacting a $C_2$–$C_{30}$ olefin or derivative thereof with a heteropolyacid. The heteropolyacid catalyst can be a partially or fully exchanged with cations from the elements in groups IA, IIA and IIIA of the periodic chart, Group IB-VIIB elements and Group VIII metals, including manganese, iron, cobalt, nickel, copper, silver, zinc, boron, aluminum, bismuth, or ammonium or hydrocarbyl-substituted ammonium salt. The heteropolyacids can be used in their initial hydrated form or they can be treated (calcined) to remove some or all of the water of hydration. The calcining is preferably conducted in air at a temperature of, for instance, up to 375° C.; temperatures much over 350° C. do not generally provide much advantage. In the resulting polymers, the combined terminal vinylidene and β-isomer content is preferably at least 30%.

U.S. Pat. No. 2,982,799 (Klinkenberg, May 2, 1961) reports that at about 20–200° C. isobutylene can be polymerized by use of a specially prepared heteropolyacid catalyst. The catalyst consisted of a heteropolyacid deposited on a solid carrier. The solid carrier had an alkali (including ammonium) content of less than one milliequivalent per 100 grams of carrier and a silico-tungstic acid concentration of 0.5–8% by weight of the total catalyst. The system resulted in oligomers up to $C_{16}$ from isobutylene, or a degree of polymerization of four. The temperature used was above 20° C.

It is believed to be desirable to use highly reactive polyolefins to prepare hydrocarbyl-substituted acylating agents (e.g., anhydrides) by way of a thermal route rather than a chlorine catalyzed route. The thermal route avoids products containing chlorine. The reactivity of the polyolefin is believed to be related to the end group in the polymer with terminal olefins (terminal vinylidene) and terminal groups capable of being isomerized thereto being identified as the reactive species. The groups capable of being isomerized to the terminal vinylidene (I) group are the β-isomers (II) of Table 1.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include hydrocarbon substituents, substituted hydrocarbon substituents, and hetero substituents, that is, substituents which, while having a predominantly hydrocarbon character, contain other than carbon in a ring or chain otherwise composed of carbon atoms. In general, no more than two, preferably no more than one, non-hydrocarbon substituents will be present for every ten carbon atoms in the hydrocarbyl group; typically, there will be no non-hydrocarbon substituents in the hydrocarbyl group.

Conventional polyolefin synthesis involves Friedel-Crafts type catalysts reacting with terminal olefins such as isobutene or mixtures of compounds such as a $C_4$ raffinate from a cat cracker or an ethylene plant butane/butene stream. The polyolefins so synthesized are not noted for having high terminal vinylidene contents and are thus not the reagents of choice to use the thermal route to forming polyolefin substituted succinic anhydrides. Conventional polyisobutylene ("PIB") when used in thermal condensation procedures with maleic anhydride give low yields and high tar contents and low succination ratios. The thermal route to substituted succinic anhydrides using highly reactive PIB's has been discussed in detail in U.S. Pat. Nos. 5,071,919, 5,137,978, 5,137,980 and 5,241,003, all issued to Ethyl Petroleum Additives, Inc.

The isomer content of a conventional ($AlCl_3$) and high terminal vinylidene PIB's are shown in Table 1. Conventional PIB has terminal vinylidene content of roughly 5%. The terminal isomer groups of conventional PIB and high vinylidene PIB are given below in Table 1 and those published in EPO 0355 895. However, in this invention polyisobutylene containing relatively high content of vinylidene and β-isomers can be formed. Such materials can contain at least 30 percent terminal vinylidene (I) and β-isomer (II) groups, as shown below. In preferred cases the polyisobutylene can contain at least 30 percent terminal vinylidene (I) groups, and more preferably at least 60 percent terminal vinylidene groups.

TABLE 1

| PIB Terminal Groups | Percent in Conventional PIB |
|---|---|
| $CH_3$—$C(CH_3)(CH_3)$—$CH_2$—$C(CH_3)$=$CH_2$ <br> I   Vinylidene (α-olefin) | 4–5% |
| $CH_3$—$C(CH_3)(CH_3)$—$CH$=$C(CH_3)(CH_3)$ <br> II   β-Isomer (of vinylidene) | |
| —$CH_2$—$C(CH_3)$=$CH$—$CH_3$ <br> III   Tri-substituted | 63–67% |

TABLE 1-continued

| PIB Terminal Groups | Percent in Conventional PIB |
|---|---|
| 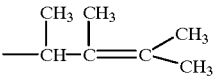 | 22–28% |
| IV  Tetra-substituted | |
| 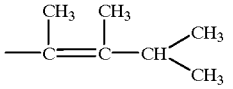 | |
| IVA | |
| 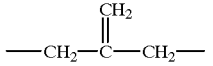 | 5–8% |
| V  Other | 0–10% |

As can be seen from the structures in Table 1, conventional PIB is characterized by very low terminal vinylidene groups (I) and species capable of isomerization therewith (II). Conventional PIB further comprises a distinct tri-substituted terminal olefin group (III) which is nearly absent or present in only a low level in high vinylidene PIB. The distinct terminal group III is a 2-butene in which the 2-carbon is tri-substituted.

Structure IVA of Table 1 is an acid-catalyzed rearrangement product of IV while V is an internal vinylidene group. The terminal group content of conventional and high vinylidene PIBs have been determined by NMR analysis. Conventional PIBs are commercially available under various tradenames including Parapol® from Exxon, Lubrizol® 3104, 3108 from Lubrizol and Indopol® from Amoco and Hyvis® from BP. Conventional PIBs have number average molecular weight in the range of 300–5000, but the preferred number average molecular weight is in the range of 500–2000.

SUMMARY OF THE INVENTION

The present invention provides a method for producing polymers by polymerization of at least one olefin, the method comprising:

contacting (a) at least one $C_2$–$C_{30}$ olefin or polymerizable derivatives thereof with (b) a catalyst comprising a partially or fully neutralized ammonium salt of a heteropolyacid, wherein said catalyst has been calcined at above 350° C. to 500° C.;

whereby the efficiency of polymerization is increased compared to the efficiency in the absence of such calcining.

The present invention further provides polymers of isobutylene having a $\overline{M}_n$ of at least 1500, $\overline{M}_w/\overline{M}_n$ of greater than 4, preferably 7.5 to 20, and preferably at least 30% terminal vinylidene (I) groups.

DETAILED DESCRIPTION OF THE INVENTION

Heteropolyacid catalysts can exist as the free acid or as a salt of a heteropolyanion. Heteropolyanions are polymeric oxoanions formed by a condensation reaction of two or more different oxoanions, e.g.,

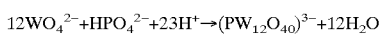

A variety of structures are known for these materials; they can have, for instance, the so-called Keggin structure, wherein twelve $WO_6$ octahedra surround a central $PO_4$ tetrahedron (in the case where phosphorus is employed). Other structures and related formulas are also known, including $PW_{12}O_{42}$, $PW_{18}O_{62}$, $P_2W_5O_{23}$, $PW_9O_{32}$, $PW_6O_{24}$, $P_2W_{18}O_{62}$, $PW_{11}O_{39}$, and $P_2W_{17}O_{61}$, where P and W are taken as representative elements and the indicated structure is an ion with the appropriate charge. The central atom of the Keggin structure, which is typically phosphorus, as shown, can also be any of the Group IIIA to Group VIIA (ACS numbering) metalloids or non-transition metals, including P, As, Si, Ge, B, Al, Sb, and Te. The tungsten (W) in the above formula fills the role known as the "poly atom," which can be any of the Group VB or VIB transition metals, including W, V, Cr, Nb, Mo, or Ta. Thus suitable materials include preferably phosphomolybdates, phosphotungstates, silicomolybdates, and silicotungstates. Other combinations selected from among the above elements are also possible, including borotungstates, titanotungstates, stannotungstates, arsenomolybdates, teluromolybdates, aluminomolybdates, and phosphovanadyltungstates, the latter representing a mixed material having a formula (for the anion portion) of $PW_{11}VO_{40}$. The preferred material is a phosphotungstate, which term generally encompasses both the acid and the various salts, described below.

The heteropoly catalysts are active both as their acid form, in which the anion is associated with the corresponding number of hydrogen ions, in the fully salt form, in which the hydrogen ions have been replaced by other cations such as metal ions, or in the partially exchanged salt form, in which a portion of the hydrogen ions have been thus replaced. For more detailed information on the structures of heteropoly catalysts, attention is directed to Misono, "Heterogeneous Catalysis by Heteropoly Compounds of Molybdenum and Tungsten," Catal. Rev.—Sci. Eng., 29(2&3), 269–321 (1987), in particular, pages 270-27 and 278–280. In the present invention, the hydrogen ions have been partially or fully replaced by ammonium, that is the catalyst is a partially or fully neutralized ammonium salt of a heteropolyacid. Moreover, the catalyst has been calcined at above 350° C. to 500° C.

Heteropoly acids are commercially available materials, (e.g., Aldrich Chemical Company, #22,420-0). The salts are similarly commercially available. Alternatively, they can be prepared from the acid materials by neutralization with an appropriate amount of base. Heteropoly acids are generally received in a hydrated form. They can be successfully employed in this form (uncalcined) or as in the present invention, they can be treated (calcined) to remove some or all of the water of hydration, that is, to provide a dehydrated or otherwise modified species, which in the context of the present invention exhibits improved reactivity. Calcining can be conducted by simply heating the hydrated material to a suitable temperature to drive off the desired amount of water. The heating can be under ambient pressure or reduced pressure, or it can be under a flow of air or an inert gas such as nitrogen. The use of air ensures that the acid is in a high oxidation state. The flow of air can be across the surface of the catalyst, or for greater efficiency, it can be through the bulk of the catalyst. The length of time required for calcining is related to the equipment and scale, but in one broad embodiment the calcining can be conducted over the course of 5 minutes to 16 hours, more typically 30 minutes to 8 hours, and preferably 1 hour, 2 hours or even 3 hours, up to 4 hours. The upper limits of time are defined largely by the economics of the process; times in excess of about 5 hours do not generally provide much advantage.

The material which is calcined to prepare the catalysts for use in the present invention is preferably an ammonium salt of $H_3PW_{12}O_{40}$. Typical ammonium salts include $(NH_4)_3PW_{12}O_{40}$ and $(NH_4)_{2.5}H_{0.5}PW_{12}O_{40}$. While generally the temperature of calcining will be in the range of above 350° C. to 500° C. and preferably 375 to 475° C., the optimum conditions will depend to some extent on the particular ammonium salt which is selected. When the starting salt is $(NH_4)_3PW_{12}O_{40}$, it has been found that relatively higher temperatures are desirable for obtaining the most active catalyst. Therefore, such material is preferably calcined at 450 to 475° C. When the starting salt is $(NH_4)_{2.5}H_{0.5}PW_{12}O_{40}$, desirable calcining temperatures can be somewhat lower, namely, above 350 to 475° C. and preferably above 375 to 475° C. When the calcining temperature is too low, the catalysts may be largely or entirely inactive. For instance, when $(NH_4)_3PW_{12}O_{40}$ is treated at below 350° C., it is generally found to be substantially inactive to provide the polymers of the present invention. This phenomenon is not fully understood; but, without intending to limit the generality or scope of the invention, it is believed that the high temperature calcining serves to remove a portion of the ammonia from the catalyst, thereby leading to a more active species. The time and temperature of the calcining are believed to be interrelated to some extent, so that use of temperatures in the lower ranges can be more effective when the calcining is conducted for a longer period of time, and vice versa, as will be apparent to the person skilled in the art.

The catalyst can be employed as particles of the pure salt, or it can be provided on a solid support of an inert material such as alumina, silica/alumina, an aluminophosphate, a zeolite, carbon, clay, or, preferably, silica. The source of the solid silica support can be a colloidal silica, which is subsequently precipitated during the catalyst preparation, or a silica which has already been preformed into a solid material. The catalyst can be coated onto the support by well-known catalyst impregnation techniques, e.g., by applying the catalysts as a solution, followed by drying, such as by spray drying or evaporation. If a support such as silica is employed, the ratio of the active catalyst component to the silica support will preferably be in the range of 0.5:99.5 to 50:50 by weight, preferably 3:97 to 40:60 by weight, and more preferably 10:90 to 30:70 by weight.

The temperatures used in this invention for the polymerization of olefins is preferably below 20° C. and more preferably below 10° C. Preferred temperature ranges are −30 to 20° C., more preferably −20 to 10° C. and most preferably about −5° C., which is the approximate reflux temperature of isobutylene. The polymerization can be conducted in a batch apparatus or using continuous apparatus, such as a continuous stirred tank reactor or a tubular reactor, as will be apparent to those skilled in the art. The residence time of the polymerization reaction will vary with conditions including the type of reactor. Generally suitable residence times of 5 or 10 to 60 minutes, preferably 20 to 40 minutes. The polymerization can be conducted neat but is preferably conducted in the presence of a substantially inert hydrocarbon solvent or diluent, such as isobutane, pentane, hexane, octane, decane, kerosene, or Stoddard Solvent, which will normally be removed by conventional means at the conclusion of the reaction. The reaction using the catalysts of the present invention will generally provide at least a 10% conversion under these conditions, and preferably at least 20 or 25% conversion to polymer.

The preferred products are polyisobutylenes having $\overline{M}_n$ greater than 300. For the $C_4$ isobutylene, this would correspond to an average degree of polymerization (dp) of about 5.3. The preferred $\overline{M}_n$ of polyisobutylene is at least 500 and more preferably at least 1000 or 1500, and up to 5,000, preferably in the range of 2000 to 5000. Such materials are particularly useful when used in reactions to alkylate maleic anhydride and for subsequent derivatization to form, e.g., imides, for use as additives for lubricants, as is well known to those skilled in the art. As well as isobutylenes, other $C_2-C_{30}$ olefins and derivatives thereof may be used in this invention as well as styrene and derivatives thereof, conjugated dienes such as butadiene and isoprene and non-conjugated polyenes. The reaction to produce polymers may be run with mixtures of starting olefins to form copolymers. The mole ratio of olefin substrate to catalyst in this invention ranges from 1,000:1 to 100,000 to 1.

The polymers produced by the process of this invention are derived from $C_2-C_{30}$ olefin monomers and mixtures thereof and derivatives thereof. Under this terminology, styrene and derivatives would be a $C_2$-olefin substituted by a phenyl group.

Useful olefin monomers from which the polyolefins of this invention can be derived are polymerizable olefin monomers characterized by the presence of one or more unsaturated double bonds (i.e., >C=C<); that is, they are monoolefinic monomers such as ethylene, propylene, butene-1, isobutylene, and octene-1 or polyolefinic monomers (usually diolefinic monomers) such as butadiene-1,3 and isoprene.

These olefin monomers are preferably polymerizable terminal olefins; that is, olefins characterized by the presence in their structure of the group —R'—CH=CH$_2$, where R' is H or a hydrocarbyl group. However, polymerizable internal olefin monomers (sometimes referred to in the patent literature as medial olefins) characterized by the presence within their structure of the group:

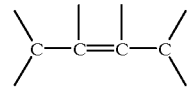

can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, for example, pentadiene-1,3 (i.e., piperylene) is deemed to be a terminal olefin for purposes of this invention.

While the polyalkenes of this invention generally are hydrocarbon polyalkenes, they can contain substituted hydrocarbon groups such as lower alkoxy, and carbonyl, provided the non-hydrocarbon moieties do not substantially interfere with the functionalization reactions of this invention. Preferably, such substituted hydrocarbon groups normally will not contribute more than 10% by weight of the total weight of the polyalkenes. Since the polyalkene can contain such non-hydrocarbon substituents, it is apparent that the olefin monomers from which the polyalkenes are made can also contain such substituents. Normally, however, as a matter of practicality and expense, the olefin monomers and the polyalkenes will be free from non-hydrocarbon groups— (as used herein, the term "lower" when used with a chemical group such as in "lower alkyl" or "lower alkoxy" is intended to describe groups having up to seven carbon atoms.)

Although the polyalkenes of this invention may include aromatic groups (especially phenyl groups and lower alkyl- and/or lower alkoxy-substituted phenyl groups such as para-(tert-butyl)phenyl) and cycloaliphatic groups such as would be obtained from polymerizable cyclic olefins or cycloaliphatic substituted-polymerizable acrylic olefins, the polyalkenes usually will be free from such groups. Again, because aromatic and cycloaliphatic groups can be present, the olefin monomers from which the polyalkenes are prepared can contain aromatic and cycloaliphatic groups.

There is a general preference for polyalkenes which are derived from the group consisting of homopolymers and interpolymers of terminal hydrogen olefins of 2 to 16 carbon atoms. A more preferred class of polyalkenes are those selected from the group consisting of homopolymers and interpolymers of terminal olefins of 2 to 6 carbon atoms, more preferably 2 to 4 carbon atoms.

Specific examples of terminal and internal olefin monomers which can be used to prepare the polyalkenes of this invention include propylene; butene-1; butene-2; isobutylene; pentene-1; hexene-1; heptene-1; octene-1; nonene-1; decene-1; pentene-2; propylene-tetramer; diisobutylene; isobutylene trimer; butadiene-1,2; butadiene-1,3; pentadiene-1,2; pentadiene-1,3; isoprene; hexadiene-1,5; 2-chloro-butadiene-1,2; 2-methyl-heptene-1; 3-cyclohexylbutene-1; 2-methyl-5-propyl-hexene-1; pentene-3; octene-4; 3,3-dimethyl-pentene-1; styrene; 2,4-dichlorostyrene; divinylbenzene; vinyl acetate; allyl alcohol; 1-methyl-vinyl acetate; ethyl vinyl ether; and methyl vinyl ketone. Of these, the hydrocarbon polymerizable monomers are preferred and of these hydrocarbon monomers, the terminal olefin monomers are particularly preferred.

Useful polymers formed in this invention include alpha-olefin homopolymers and interpolymers, and ethylene/alpha-olefin copolymers and terpolymers. Specific examples of polyalkenes include polypropylene, polybutene, ethylene-propylene copolymer, ethylene-butene copolymer, propylene-butene copolymer, styrene-isobutylene copolymer, isobutylene-butadiene-1,3 copolymer, propene-isoprene copolymer, isobutylenechloroprene copolymer, isobutylene-(para-methyl)styrene copolymer, copolymer of hexene-1 with hexadiene-1,3, copolymer of octene-1, copolymer of 3,3-dimethyl-pentene-1 with hexene-1, and terpolymer of isobutylene, styrene and piperylene. More specific examples of such interpolymers include copolymer of 95% (by weight) of isobutylene with 5% (by weight) of styrene; terpolymer of 98% of isobutylene with 1% of piperylene and 1% of chloroprene; terpolymer of 95% of isobutylene with 2% of butene-1 and 3% of hexene-1; terpolymer of 60% of isobutylene with 20% of pentene-1; and 20% of octene-1; terpolymer of 90% of isobutylene with 2% of cyclohexene and 8% of propylene; and copolymer of 80% of ethylene and 20% of propylene. U.S. Pat. No. 5,334,775 describes polyolefin based polymers of many types and their monomer precursors and is herein incorporated by reference for such disclosure.

Relative amounts of end units in conventional and high vinylidene polyisobutylenes are determined from NMR spectra made using a Burker AMX 300 or 500 instrument and UXNMRP software to work up the spectra. The spectra are determined at 300 or 500 MHz in $CDCl_3$. Band assignments in the NMR for the various isomers as parts per million (ppm) down field shift from tetramethyl silane are: terminal vinylidene 4.68 and 4.89, β-isomer 5.18, trisubstituted 5.17 and 5.35, tetra 2.88.

The molecular weight of the isomers are typically determined by GPC on a Waters 150 instrument run with tetrahydrofuran solvent. The columns are Waters ultra-styrogel of pore size $10^4$ Å, $10^3$ Å, 500 Å, and 300 Å which have been calibrated with PIB standards. Styrene molecular weight standards are also useful. $\overline{M}_n$ and $\overline{M}_w$ are determined from comparative elution volume data. Molecular weight values of the polymers produced by the method of this invention will vary according to their degree of polymerization. The dp range for products of this invention typically range from 6 to 350 or even higher.

The polydispersity of the products of this invention as determined by the ratio of $\overline{M}_w/\overline{M}_n$ may have a value of up to 20 depending upon reaction conditions. At any given reaction temperature, the $\overline{M}_w/\overline{M}_n$ is controlled by the chemical nature of the catalyst as well as the contact time of the olefin with the catalyst and the concentration of the olefin during the reaction. Use of the calcined ammonium catalysts of the present invention in the polymerization of isobutylene leads to polyisobutylene having a polydispersity typically greater than 4, or 5, often 7.5 to 20, more commonly 8 to 19 or 18. The present invention provides a way of preparing such materials directly, from a single polymerization reaction, as opposed to by blending of different batches prepared from separate polymerization reactions. It is, of course, well known to prepare polymeric mixtures of high polydispersity by physical admixture of samples of polymers of significantly different molecular weights. Such blending, however tends to produce polymeric mixtures which are polymodal (including bimodal) or otherwise non-uniform in their molecular weight distribution. The process of the present invention, on the other hand, can lead to polymers having a relatively uniform or monomodal molecular weight distribution, yet having the present high degree of polydispersity.

EXAMPLES

Example 1

Catalyst Preparation

In a fume hood, a solution of 3.78 g (0.0394 moles) of $(NH_4)_2CO_3$ in water (30 mL) is added dropwise to a solution of 100 g (0.0315 moles, containing 9.23% water) $H_3PW_{12}O_{40}$ in water (120 mL), resulting in a milky-white slurry. The water is evaporated by heating or by spray drying to isolate the solid ammonium salt $(NH_4)_{2.5}$ catalyst. The catalyst is calcined under air flow in a glass tube mounted in an oven at 450° C. for 2 hours or for other times and temperatures indicated hereafter.

Example 2

Polymerization (Reference):

A 500 mL 3-necked round bottom flask is charged with 100 mL cyclohexane which is stirred under a nitrogen atmosphere for 60 minutes. To the flask is added 0.50 g of $(NH_4)_{2.5}H_{0.5}PW_{12}O_{40}$ catalyst, prepared as in Example 1 but calcined at 350° C. for 180 minutes. The flask, while continuously maintaining a nitrogen atmosphere, is fitted with a cold finger on a jacketed addition funnel, a nitrogen inlet, and a thermometer. Isobutylene (59 g) is condensed into the addition funnel and is added to the vessel with stirring at 0° C. to 7° C. After 30 minutes of stirring, methanol is added to the vessel by a syringe in order to quench the catalyst. The liquid, containing the product polymer, is decanted off the solid particles and the volatiles are removed under reduced pressure from the liquid portion to provide 7.3 g of an oil (12.4% yield) having a $\overline{M}_n$ of 1699 (determined by gel permeation chromatography) and a $\overline{M}_w/\overline{M}_n$ of 11.94.

Example 3

Polymerization

In a 1000 mL 4-necked round bottom flask, fitted with a cold finger on a jacketed addition funnel, a nitrogen inlet, a monomer inlet, and a thermometer is established a nitrogen atmosphere. To the flask is added 100 mL hexane, which is stirred for 30 minutes. Thereupon, 0.20 g of $(NH_4)_{2.5}H_{0.5}PW_{12}O_{40}$ catalyst, prepared as in Example 1, is added to the vessel. Isobutylene, 59 g is condensed into the addition funnel and added to the vessel. The temperature is maintained at −6° C. to 9° C. After 30 minutes of stirring, 10 mL water is injected into the mixture to deactivate the catalyst. The organic liquid phase is removed by decantation and is concentrated under reduced pressure to provide 14.5 g of an oil (25% yield) having a $\overline{M}_n$ of 2149 (by GPC), a $\overline{M}_w/\overline{M}_n$ of 11.57, and a vinylidene end group content of 75%.

Examples 4–9

Using procedures similar to those set forth above, the following polymerizations of isobutylene are conducted. In the table below, n represents the number of ammonium ions in the catalyst $(NH_4)_nH_{3-n}PW_{12}O_{40}$. "n.d." means not determined.

TABLE 2

| Example | n | Calcining temp, ° C. | Calcining time, hr | Yield % | $\overline{M}_n$ | $\overline{M}_w/\overline{M}_n$ | % vinylidene |
|---|---|---|---|---|---|---|---|
| 4 (ref.) | 2.5 | 250 | 3 | 2.5 | 692 | 18.5 | 81 |
| 5 (ref.) | 2.5 | 350 | 3 | 28.0 | 2742 | 9.98 | 77 |
| 3 | 2.5 | 450 | 2 | 25.0 | 2149 | 11.57 | 75 |
| 6 | 2.5 | 450 | 5 | 36.0 | 2088 | 7.86 | 79 |
| 7 | 2.75 | 375 | 4 | 0.7 | n.d. | n.d. | n.d. |
| 8 | 3 | 375 | 3 | 0.7 | n.d. | n.d. | n.d. |
| 9 | 3 | 450 | 5 | 25.0 | 2834 | 10.5 | n.d. |

Example 10

Polymerization

A 4-necked round bottom vessel (1000 mL) is fitted with a jacketed addition funnel, a nitrogen inlet, a dry ice condenser, and a thermometer. A nitrogen atmosphere is established in the vessel. Isobutylene (118 g) is condensed into the funnel and then added to the vessel. The $(NH_4)_{2.5}H_{0.5}PW_{12}O_{40}$ catalyst (0.5 g) is added and the reaction mixture is magnetically stirred and maintained at −5 to −6° C. for 30 minutes. Thereafter water (50 mL) is added to quench the reaction, followed by hexane (200 mL). The organic layer is separated, dried over $MgSO_4$, filtered, and concentrated under reduced pressure (6.66 kPa [50 mmHg] at 160° C.) to provide 62.6 g of a product having $\overline{M}_n$=2882, $\overline{M}_w/\overline{M}_n$=9.73, and 74% terminal vinylidene groups.

Example 11

Polymerization

A 4-necked bottom-drain vessel (2000 mL) is fitted with a mechanical stirrer, a nitrogen inlet, a thermometer, a dry ice condenser, an Isco™ pump for addition of isobutylene, and a solids addition funnel containing $(NH_4)_{2.5}H_{0.5}PW_{12}O_{40}$ catalyst. A nitrogen atmosphere is established in the vessel. Isobutylene (200 mL) is added to the vessel and is allowed to reflux at −6° C. Addition of the catalyst (4.2 g over the course of 4 hours) is begun. Isobutylene (1800 mL) is added over the 4 hour reaction time. Product and monomer are removed via the bottom drain at a rate comparable to the rate of addition of monomer, to maintain a constant volume in the reactor. Isolation and characterization of the polymer during the course of the reaction indicates a material of having the following characteristics:

|  | $\overline{M}_n$ | $\overline{M}_w/\overline{M}_n$ | % vinylidene end groups | % monomer conversion |
|---|---|---|---|---|
| fraction a | 3171 | 9.58 | 78 | 48 |
| fraction b | 1940 | 13.9 | 24 | 39 |
| range | 1853–3171 | 9.6–14.0 | 24–79 | 39–62 |

Overall conversion of monomer to polymer over the course of reaction is 49%

Example 12

A supported catalyst is prepared by coating $(NH_4)_{2.5}H_{0.5}PW_{12}O_{40}$ onto silica by solution treatment followed by drying. The supported catalyst is calcined at 450° C. for 3 hours.

A 4-neck 1000 mL round bottom vessel is fitted with a jacketed addition funnel, a nitrogen inlet, a dry ice condenser, and a thermometer. A nitrogen atmosphere is established in the vessel, Isobutylene (118 g) is condensed into the funnel and is then added to the vessel. The supported catalyst, 0.50 g, is added to the vessel and reaction mixture is magnetically stirred and maintained at −5 to −6° C. for 30 minutes. The reaction is quenched by addition of 50 mL water followed by 200 mL hexane. The organic layer is separated, dried over $MgSO_4$, filtered, and concentrated under reduced pressure (6.66 kPa [50 mmHg] at 160° C.) to provide 8.0 g (6.7% yield) of product having $\overline{M}_n$ 3032, $\overline{M}_w/\overline{M}_n$ of 5.27, and 81 % terminal vinylidene content.

It is known that some of the materials described above may interact in the final formulation, so that the components of the final formulation may be different from those that are initially added. For instance, certain ions can migrate to sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing or using the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

What is claimed is:

1. A method for preparing polyisobutylene by polymerization of isobutylene, the method comprising:
    contacting (a) isobutylene with (b) a catalyst comprising a partially or fully neutralized ammonium salt of a heteropolyacid, wherein the polyisobutylene contains at least about 30 percent terminal vinylidene groups, wherein said catalyst has been calcined at above 350° C. to about 500° C.;

whereby the efficiency of polymerization is increased compared to the efficiency in the absence of such calcining;

wherein the polyisobutylene has a $\overline{M}_w/\overline{M}_n$ of at least about 9.58 and an $\overline{M}_n$ of about 500 to about 5000.

2. The method of claim 1 wherein the catalyst is a calcined ammonium salt of a phosphotungstic acid, a silicotungstic acid, a phosphomolybdic acid, or a silicomolybdic acid.

3. The method of claim 1 wherein the catalyst is a calcined ammonium salt of a phosphotungstic acid.

4. The method of claim 1 wherein the catalyst is a calcined ammonium salt of $H_3PW_{12}O_{40}$.

5. The method of claim 1 wherein the catalyst is the product of calcining $(NH_4)_3PW_{12}O_{40}$.

6. The method of claim 5 wherein the catalyst has been calcined at about 450 to about 475° C.

7. The method of claim 1 wherein the catalyst is the product of calcining $(NH_4)_{2.5}H_{0.5}PW_{12}O_{40}$.

8. The method of claim 7 wherein the catalyst has been calcined at above 350 to about 475° C.

9. The method of claim 7 wherein the catalyst has been calcined at above 375 to about 475° C.

10. The method of claim 1 wherein the catalyst has been calcined for about 5 minutes to about 16 hours.

11. The method of claim 1 wherein the catalyst has been calcined for about 30 minutes to about 8 hours.

12. The method of claim 11 wherein the catalyst has been calcined for about 1 to about 4 hours.

13. The method of claim 1 wherein the catalyst comprises a silica support.

14. The method of claim 1 wherein the polymerization reaction is conducted at a temperature of about −30° C. to about 20° C.

15. The method of claim 1 wherein the polymerization reaction is conducted at a temperature of about −20° C. to about 10° C.

16. The method of claim 1 wherein the polymerization reaction is conducted in a batch apparatus.

17. The method of claim 1 wherein the polymerization reaction is conducted in a continuous apparatus.

18. The method of claim 17 wherein the polymerization reaction is conducted in a continuous stirred tank reactor.

19. The method of claim 17 wherein the residence time is about 5 to about 60 minutes.

20. The method of claim 17 wherein the residence time is about 20 to about 40 minutes.

21. The method of claim 1 wherein the polymerization is conducted in the presence of a substantially inert hydrocarbon diluent.

22. The method of claim 1 wherein the polymer is prepared in a conversion of at least about 10%.

23. The method of claim 1 wherein said catalyst has been calcined for at least about 3 hours.

24. A polymer prepared by polymerization of at least one olefin, the polymerization method comprising:

contacting (a) at least one $C_2$–$C_{30}$ olefin or polymerizable derivatives thereof with (b) a catalyst comprising a partially or fully neutralized ammonium salt of a heteropolyacid, wherein said catalyst has been calcined at above 375° C. to about 500° C.;

whereby the efficiency of polymerization is increased compared to the efficiency in the absence of such calcining;

said polymer having a $\overline{M}_n$ of about 2000 to about 5000 and $\overline{M}_w/\overline{M}_n$ of about 9.58 to about 20.

25. The polymer of claim 24 wherein the olefin comprises isobutylene.

26. The polymer of claim 25 wherein the polymer is polyisobutylene.

27. The polymer of claim 26 wherein the polyisobutylene contains at least about 30 percent terminal vinylidene (I) groups.

28. A polymer of isobutylene having a $\overline{M}_n$ of about 2000 to about 5000 and $\overline{M}_w/\overline{M}_n$ of about 9.58 to about 20.

29. The polymer of claim 28, having at least about 30% terminal vinylidene (I) groups.

30. The polymer of claim 28 having at least about 60% terminal vinylidene (I) groups.

31. The polymer of claim 28 having been prepared from a single polymerization reaction.

* * * * *